(12) United States Patent
Kismir et al.

(10) Patent No.: US 8,828,893 B2
(45) Date of Patent: Sep. 9, 2014

(54) FABRIC FOR AN AIR-BAG AND AN AIR-BAG INCORPORATING THE FABRIC

(75) Inventors: Altay Kismir, Windsor (CA); Anorin Shaker, Mississauga (CA)

(73) Assignee: Autoliv Delevopment AB, Vargarda (SE)

( * ) Notice: Subject to any disclaimer, the term of this patent is extended or adjusted under 35 U.S.C. 154(b) by 779 days.

(21) Appl. No.: 12/528,038

(22) PCT Filed: Mar. 1, 2007

(86) PCT No.: PCT/SE2007/000196
§ 371 (c)(1),
(2), (4) Date: Aug. 20, 2009

(87) PCT Pub. No.: WO2008/105693
PCT Pub. Date: Sep. 4, 2008

(65) Prior Publication Data
US 2010/0035499 A1 Feb. 11, 2010

(51) Int. Cl.
*B60R 21/235* (2006.01)
(52) U.S. Cl.
CPC ..... *B60R 21/235* (2013.01); *B60R 2021/23542* (2013.01); *B60R 2021/23509* (2013.01)
USPC .......................................... 442/203; 442/181
(58) Field of Classification Search
CPC .................. B60R 21/235; B60R 2021/23542; B60R 2021/23509
USPC .................................................. 442/181, 203
See application file for complete search history.

(56) References Cited

U.S. PATENT DOCUMENTS

| 5,131,434 A * | 7/1992 | Krummheuer et al. ......... 139/35 |
| 2003/0047918 A1* | 3/2003 | Hill ............................. 280/730.2 |
| 2006/0128244 A1* | 6/2006 | Hill ................................. 442/203 |
| 2006/0284403 A1* | 12/2006 | Hill ............................. 280/743.1 |

FOREIGN PATENT DOCUMENTS

| GB | 2272869 A | 6/1994 |
| GB | 2297950 A | 8/1996 |
| GB | 2410725 A * | 8/2005 |
| WO | WO-90/09295 A | 8/1990 |
| WO | WO 9220847 A1 * | 11/1992 |

* cited by examiner

*Primary Examiner* — Peter Y Choi
*Assistant Examiner* — Vincent A Tatesure
(74) *Attorney, Agent, or Firm* — Harness, Dickey & Pierce, P.L.C.

(57) ABSTRACT

A fabric for an air-bag is woven in a pattern which comprises a plurality of fields. At least one of the fields has a first weave pattern, and at least another of the fields has a second weave pattern. The second weave pattern is relatively loosely-woven compared to the first weave pattern. The fabric may be used in the region of one or more mounts of an air-bag.

7 Claims, 2 Drawing Sheets

FABRIC FOR AN AIR-BAG AND AN AIR-BAG INCORPORATING THE FABRIC

CROSS-REFERENCE TO RELATED APPLICATIONS

This application is a 371 U.S. National Stage of International Application No. PCT/SE2007/000196, filed Mar. 1, 2007, and published in English as WO 2008/105693 A1 on Sep. 4, 2008, the entire disclosure of which is incorporated herein by reference.

FIELD

THE PRESENT INVENTION relates to an air-bag of the general type intended to be used as part of a safety device in a motor vehicle and, more particularly, relates to a particular form of fabric for use in fabrication of such an air-bag.

BACKGROUND

It has been proposed previously to provide many types of air-bag which incorporate a mounting region or mounting tabs in order to mount the air-bag in position. One particular form of air-bag of this type is the so-called inflatable curtain. An air-bag of this general type is disclosed in GB 2297950A.

FIG. 1 illustrates a part of an inflatable curtain air-bag. The air-bag has an inflatable region 1 which has a generally linear upper edge 2. The inflatable region 1 is formed by two superimposed layers of fabric which are secured together at selected regions. In some cases, the air-bag is formed using a one-piece weaving process (as disclosed in WO90/09295), in which selected regions of the two layers of fabric are co-woven to form a single layer of fabric. In the part of the air-bag shown in FIG. 1, the two layers of fabric of the inflatable region are woven together in an area 3 to form a non-inflatable area, and are also woven together in regions 4, 5 which form seams separating individual inflatable cells 6, 7. A gas supply duct 8 is defined which extends adjacent to the upper edge 2 of the air-bag, as is conventional. The gas supply duct is in fluid communication with the inflatable cells 6, 7.

The upper edge 2 of the air-bag is provided with a plurality of protruding mounting tabs 9, each of which is provided with an aperture 10. The mounting tabs may be used to mount the air-bag in position within the roof lining of a motor vehicle, above the side windows of the vehicle.

On inflation of the air-bag, where mounted in position in a motor vehicle by the mounting tabs 9, a very substantial force is applied to the mounting tabs. In order to minimise the risk of the tabs tearing under such forces, it has been proposed to reinforce the mounting tabs by providing extra material, or by folding the material over on itself in order to increase the thickness of the mounting tabs, or even by providing additional reinforcing sewing. All of these expedients, however, increase the weight and cost of the air-bag.

In other forms of air-bag, the mount may be a ring-shaped mount surrounding a large aperture that receives a gas generator. The mount typically has apertures to receive bolts on a flange of the gas generator. Again, the mount is typically reinforced by making the mount of increased thickness, or by sewing on an extra layer of reinforcing fabric.

SUMMARY

The present in invention seeks to provide an improved fabric for an air-bag, and an air-bag made from such a fabric.

According to a first aspect of the present invention, there is provided a fabric for an airbag, the fabric being woven in a pattern comprising a plurality of fields, at least one of said fields having a first weave-pattern, and at least another of said fields having a second weave-pattern, the second weave-pattern being relatively loosely woven compared to the first weave-pattern.

Preferably, the or each field of the second pattern comprises at least one float which is longer than each float in the or each field of the first pattern.

Advantageously, the or each field of the second pattern comprises a plurality of floats which are each longer than each float in the or each field of the first pattern.

Conveniently, the or each field of the second pattern comprises at least twelve floats which are each longer than each float in the or each field of the first pattern.

Preferably, the first pattern comprises at least a region of hopsack weave.

Advantageously, the hopsack weave comprises floats of two.

Conveniently, the second pattern comprises a plurality of floats of different lengths.

Preferably, the second pattern comprises floats of between one and five.

Advantageously, the fabric comprises a plurality of fields having said first weave-pattern, and a plurality of fields having said second weave-pattern, the fields having said first pattern being arranged diagonally across the fabric.

Conveniently, the fields having said first weave-pattern are arranged in a plurality of intersecting diagonals across the fabric.

Preferably, the fields of said two weave-patterns are arranged in a chequered pattern.

Advantageously, the or each field covers an area comprising an equal number of warp yarns and weft yarns.

Conveniently, said area comprises six warp yarns and six weft yarns.

According to another aspect of the present invention, there is provided an air-bag having an inflatable region and at least one mount, the or each mount being formed from fabric as defined above.

Preferably, the or each mount is a protruding mounting tab.

BRIEF DESCRIPTION OF THE DRAWINGS

So that the invention may be more readily understood, and so that further features thereof may be appreciated, an embodiment of the invention will now be described, by way of example, with reference to the accompanying drawings, in which.

DETAILED DESCRIPTION

In the preferred embodiment of the present invention, at least the mounting tabs of an air-bag are made using a specific weave, which incorporates a pattern of relatively tightly-woven fields and relatively loosely-woven fields, which will be described in more detail below.

In the preferred embodiment, the mounting tabs are made from a single layer of such fabric, which is possible due to the improved strength of the weave.

Figure 1:
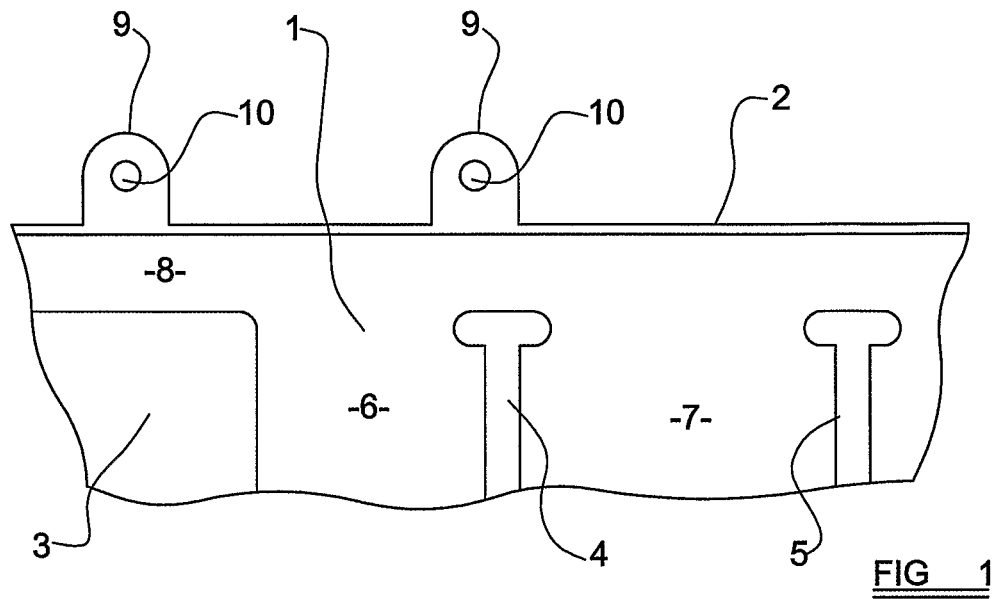
FIG. 1 is a perspective view of part of a prior-proposed air-bag.
Figure 2:
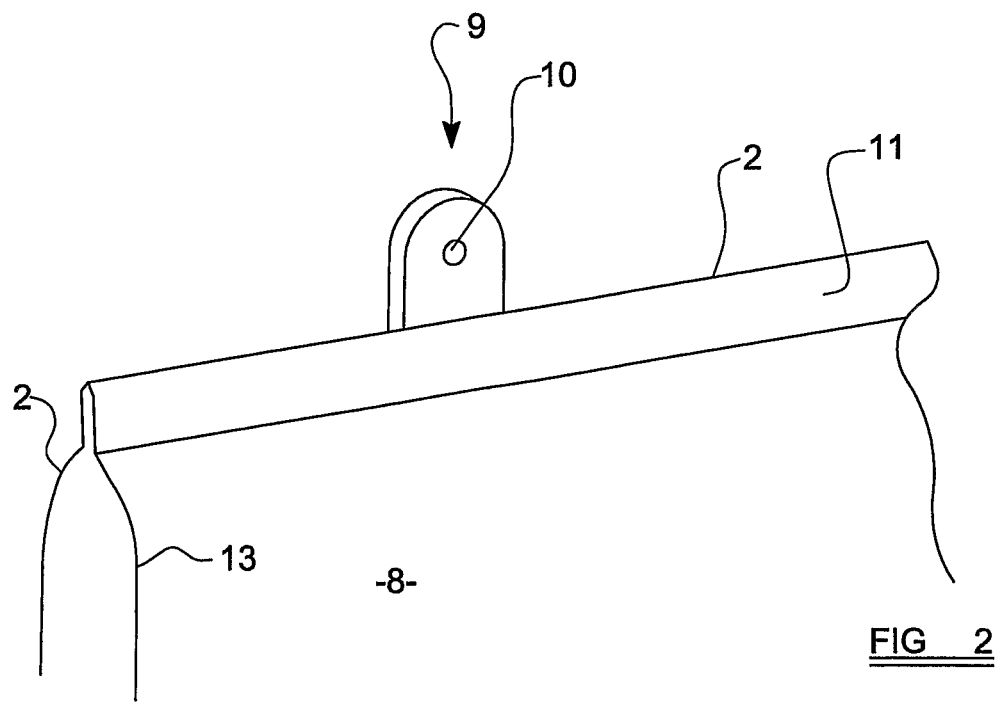
FIG. 2 is an enlarged view of part of an air-bag in accordance with the present invention.

Referring to FIG. 2 of the accompanying drawings, part of an air-bag in accordance with the present invention is shown, the air-bag being an air-bag having a design corresponding generally to that of the side curtain air-bag as shown in FIG. 1. It can be seen that in the embodiment illustrated in FIG. 2, the air-bag is formed using a one-piece weaving technique, such as that disclosed in WO90/09295. The uppermost edge 2 of the air-bag is formed into a substantially gas-impermeable seam 11 by co-weaving two separate layers of fabric which form the rest of the air-bag, a one-piece weaving technique being utilised. The two separate layers of fabric 12, 13 diverge beneath the seam 11 to form the gas-flow duct 8.

The mounting tab 9 which extends upwardly from the upper edge 2 of the air-bag is again formed from fabric as the overall structure of the air-bag is woven. As indicated above, in contrast to previously-proposed air-bags of this general type, the mounting tab 9 is preferably formed from a single thickness of woven fabric. However, this is not to say that the fabric of the present invention could not also be used in a mounting tab formed from two separately-woven layers of fabric which are subsequently stitched together, or otherwise joined to one another. The mounting tab is provided with a central aperture 10.

In the region of the tab 9, a "special" weave is utilised for the fabric as will now be described.

Figure 3:
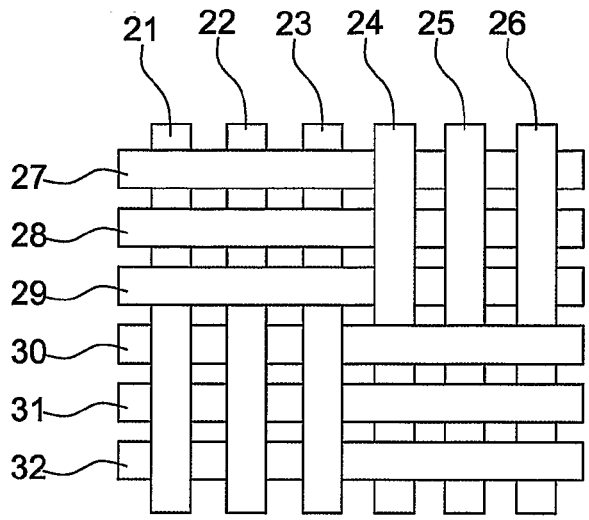
FIG. 3 is a diagrammatic view illustrating a typical hopsack fabric weave.

In many prior proposed air-bags, hopsack weave is used for the fabric of the air-bag. Hopsack weave is illustrated in FIG. 3. In a hopsack weave, a plurality of immediately-adjacent warp yarns pass together "in parallel" over and under selected groups of weft yarns, which also pass over and under precisely the same sets of warp yarns. Referring to FIG. 3, six warp yarns 21-26, and six weft yarns 27-32 are illustrated. It can be seen that the first three warp yarns 21-23, form a group of warp yarns which extend "in parallel" passing over and under exactly the same sets of weft yarns. Also, it can be seen that the second three warp yarns 24-26 form a second group of yarns which pass over and under the same selected sets of weft yarns, in a similar fashion. Similarly, the weft yarns 27-29 form a group of yarns which extend "in parallel" over and under the same sets of warp yarns, and the weft yarns 30-32 form a second group which pass over and under the same selected sets of warp yarns.

Thus, in the hopsack weave illustrated in FIG. 3, groups of three warp yarns pass over and under groups of three weft yarns, and visa-versa. The weave illustrated in FIG. 3 can therefore be described as a "3×3 hopsack weave". Hopsack can be created using groups of yarns comprising two or more yarns in each group (e.g. a "2×2 hopsack weave"). A hopsack weave is easy to fabricate, but does not have substantial strength or tear-resistance.

The fabric of the present invention utilises a new weave pattern which comprises a plurality of zones or "fields", with some of the fields having a relatively loosely-woven weave-pattern, and other of the fields having a relatively tightly-woven weave-pattern.

Figure 4:
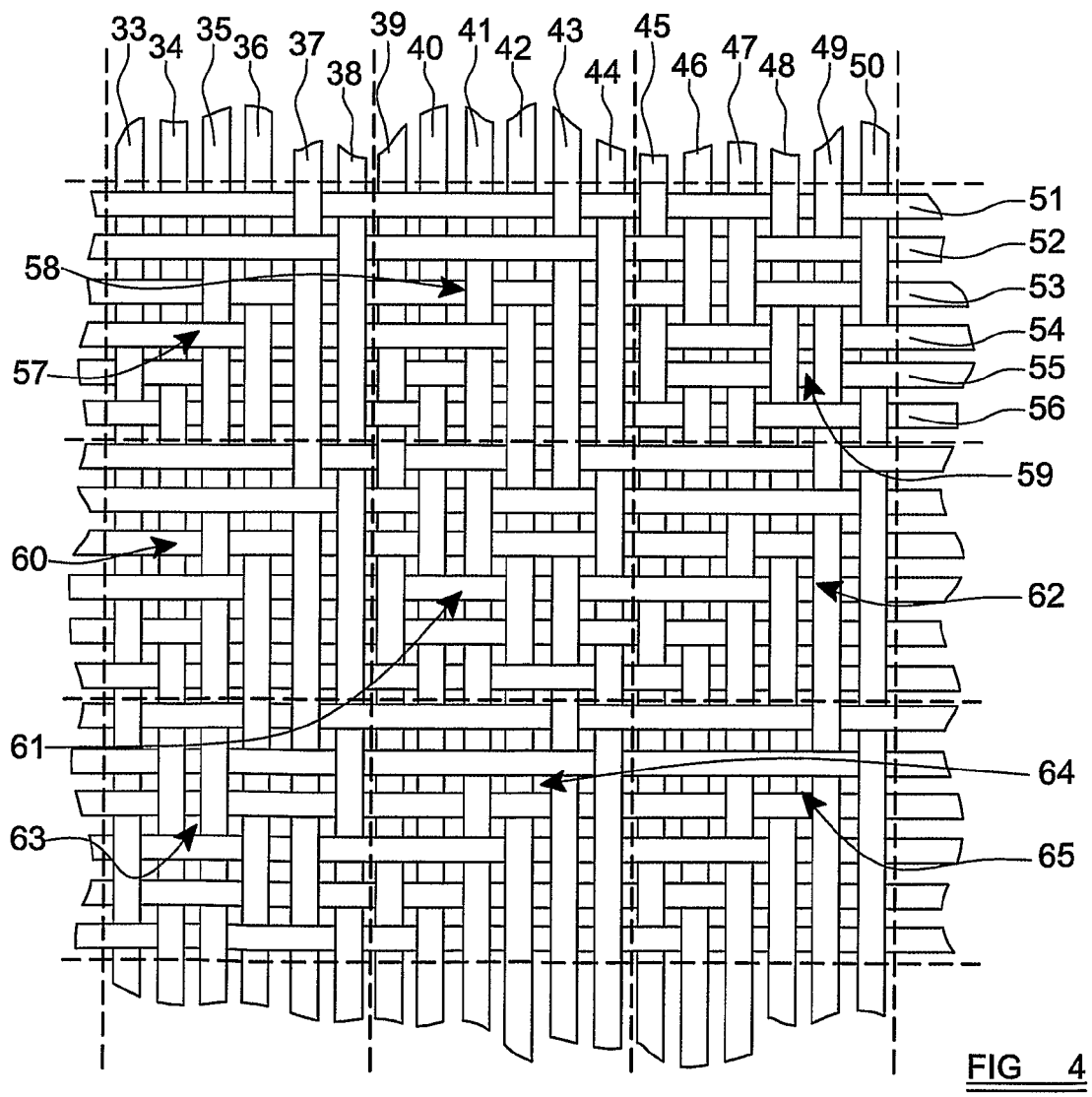
FIG. 4 is a diagrammatic view illustrating a weave as used in the present invention.

FIG. 4 illustrates an example of the weave of the present invention, and shows a plurality of warp yarns 33-50 inter-woven with a plurality of weft yarns, including weft yarns 51-56.

Considering in particular the weft yarn 51, and beginning from the left-hand side of FIG. 4, it can be seen that the weft yarn 51 initially passes over the four warp yarns 33-36, thereby forming a "float" of four. In this context, the term "float" is used to indicate the length of yarn on the surface of a woven fabric between two consecutive intersections of the yarn with the yarns woven at right-angles to it. In other words, a "float" is designated by the number of yarns over or under which the "floating" yarn passes.

After initially passing over the four warp yarns 33-36, the weft yarn 51 then passes under the warp yarn 37, after which it then proceeds to pass over the next five successive warp yarns 38-42, thereby forming a float of five. The weft yarn 51 then passes under warp yarn 43, then over warp yarn 44, under warp yarn 45 and then over the next two successive warp yarns 46, 47, creating a float of two, whereafter the weft yarn 51 then passes under the next two warp yarns 48, 49, to create another float of two, before passing over the warp yarn 50.

As is shown in FIG. 4, no two immediately-adjacent weft yarns are woven through the warp yarns in an identical manner throughout the complete weave repeat illustrated in FIG. 4. Similarly, no two adjacent warp yarns are woven through the weft yarns in an identical manner throughout the complete weave repeat illustrated. However, it will be noted that in certain regions of the illustrated weave repeat, pairs of immediately-adjacent warp and weft yarns do have an identical weave path over part of their length. For example, having regard to the top right-hand region of the weave repeat illustrated in FIG. 4, it can be seen that the right-hand third of the immediately-adjacent weft yarns 52, 53 do follow an identical weave path through the warp yarns 44-50.

Although the weave pattern, and the distribution of floats, illustrated in FIG. 4 may at first sight appear entirely random, this is not actually the case. In order to more fully understand the nature of the present invention, the fabric can therefore be considered to be divided into a number of areas or "fields", as indicated by the grid of dashed lines illustrated in FIG. 4. It will therefore be seen that the area of fabric illustrated in FIG. 4 is divided into nine such fields, indicated generally at 57-65. It will be noted that the field 59 has a weave pattern which is identical to that of the fields 61 and 63. Similarly, the weave pattern of the field 57 is identical to the weave patterns of the fields 58, 60, 62, 64 and 65. It will therefore be noted that the weave repeat illustrated in FIG. 4 comprises a number of fields, some having a first weave pattern and others having a second weave pattern.

Considering initially the weave pattern of the three fields 59, 61 and 63, which can be considered to represent the first weave pattern, then it will be noted that this weave pattern resembles a 2×2 hopsack weave, at least in its central region, where pairs of neighbouring weft yarns 52, 53 and 54, 55 pass together "in parallel" over and under adjacent pairs of warp yarns 46, 47 and 48, 49. Having regard to the size of the floats present within the first weave pattern of the fields 59, 61 and 63, it will be noted that the maximum float length is two, as represented by the central hopsack weave region of the pattern.

Turning now to consider the second weave pattern, as present in fields 57, 58, 60, 62, 64 and 65, it will be noted that the second weave pattern is less regular than that of the first weave pattern which is present in fields 59, 61 and 63. The second weave pattern comprises a plurality of floats having different lengths, including floats which are longer than the maximum length of float present within the first weave pattern. In particular, it will be seen that the second weave pattern comprises a number of floats (as represented by both warp and weft yarns) having a length of three, four and five. For example, weft yarn 51 forms a float of four as it passes over warp yarns 33-36; weft yarn 52 forms a float of five as it passes over warp yarns 33-37; weft yarn 54 forms a first float of three as it passes over warp yarns 33-35; and a second float of three as it passes under warp yarns 36-38; weft yarn 55 forms a float of four as it passes under warp yarns 35-38; and weft yarn 56 forms a float of five as it passes under warp yarns 34-38.

Similarly, warp yarn 33 forms a float of four as it passes under weft yarns 51-54; warp yarn 34 forms a float of five as it passes under weft yarns 51-55; warp yarn 36 forms a first float of three as it passes under weft yarns 51-53 and then forms a second float of three as it passes over weft yarns 54-56; warp yarn 37 forms a float of four as it passes over weft yarns 53-56; and warp yarn 38 forms a float of five as it passes over weft yarns 52-56.

Each field 57, 58, 60, 62, 64 and 65 of the second weave pattern thus comprises twelve floats in total which are each longer than the maximum length of float present in the fields 59, 61 and 63 of the first weave pattern.

Because each field comprising the second weave pattern comprises longer floats than are present in the fields of the first weave pattern, the second weave pattern of fields 57, 58, 60, 62, 64 and 65 is relatively loosely woven compared to the first weave pattern present in fields 59, 61 and 63.

It will be noted that in the embodiment illustrated in FIG. 4, the fields 59, 61, 63 having the first, tighter, weave pattern are arranged diagonally across the fabric. This arrangement of the tighter woven fields has been found to be particularly advantageous in air-bag fabric, offering good strength and tear resistance, whilst still being relatively flexible which is an important feature for mounting tabs 9. However, it is envisaged that other embodiments of the weave pattern of the present invention will incorporate fields having the tighter first weave pattern arranged in a plurality of intersecting diagonals. One such arrangement could, for example, form a fabric having a chequered pattern of fields, with the tightly-woven fields each being arranged immediately adjacent a loosely-woven field on all four sides.

It has been found that the above-described combination of relatively tightly-woven fields and relatively loosely-woven fields within a single weave repeat creates an air-bag fabric having both high elongation and high resistance to tear, whilst still retaining relatively good flexibility, all of which properties are important and advantageous, particularly in the creation of mounting tabs 9. However, it should also be appreciated that air-bags could be constructed using the weave of the present invention to provide other reinforced areas such as, for example, areas under the throat 8 which is subjected to a particularly aggressive flow of gas upon inflation, or areas where tethers are attached to the air-bag.

Whilst the present invention has been described above with particular reference to FIG. 4 which illustrates the fields 57, 65 each covering an area comprising six warp yarns and six weft yarns, it should be appreciated that in variance of the invention, the fields may be either smaller or larger than this. For example, it is envisaged that each filed could have a size encompassing up to twelve warp yarns and twelve weft yarns.

Also, whilst the invention has been described above with reference to the relatively tightly-woven fields 59, 61 and 63 having a maximum float size of two, variants of the invention may have longer float sizes of this such as, for example, floats up to a maximum length of five. In such arrangements, it is of course important that the more loosely-woven fields still have longer floats than the maximum length of float present in the loosely-woven fields.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A fabric for a mount of an airbag, the fabric being woven in a pattern comprising:
a plurality of fields of uniform size and shape having an equal number of weft yarns and warp yarns, at least a first of the fields having a first weave pattern, and at least a second of the fields having a second weave pattern, the second weave pattern being relatively loosely woven compared to the first weave pattern, the fields having the second weave pattern including first, second, third, fourth, fifth and sixth weft yarns and first, second, third, fourth, fifth and sixth warp yarns, the first weft yarn passing over the first through fourth warp yarns to form a float of four, the second weft yarn passing over the first through fifth warp yarns to form a float of five, the fourth weft yarn passing over the first through third warp yarns to form a first float of three and passing under the fourth through sixth warp yarns to form a second float of three, the fifth weft yarn passing under the third through sixth warp yarns to form a float of four, and the sixth weft yarn passing under the second through sixth warp yarns to form a float of five;
wherein the plurality of fields of the pattern are arranged in a 3×3 grid having rows and columns, the fields having the first weave pattern are arranged along a diagonal of the grid and a center field of the grid is peripherally surrounded by two fields having the first weave pattern and six fields having the second grid pattern.

2. The fabric of claim 1, wherein the fields having the first weave pattern are identical.

3. The fabric of claim 1, wherein the fields having the second weave pattern are identical.

4. The fabric of claim 1, wherein the fields having the first weave pattern are identical to one another and the fields having the second weave pattern are identical to one another.

5. The fabric of claim 1, wherein the pattern is defined by a plurality of warp yarns and a plurality of weft yarns and further wherein no adjacent weft yarns are woven through the warp yarns in an identical manner throughout the complete pattern.

6. The fabric of claim 1, wherein the pattern is defined by a plurality of warp yarns and a plurality of weft yarns and further wherein no adjacent warp yarns are woven through the weft yarns in an identical manner throughout the complete pattern.

7. The fabric for a mount of an airbag of claim 1, wherein the fields of the second weave pattern each include twelve floats longer than a maximum length of float present in the fields of the second weave pattern.

* * * * *